(12) United States Patent
Wada

(10) Patent No.: US 11,772,429 B2
(45) Date of Patent: Oct. 3, 2023

(54) TIRE

(71) Applicant: SUMITOMO RUBBER INDUSTRIES, LTD., Hyogo (JP)

(72) Inventor: Shoichi Wada, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 460 days.

(21) Appl. No.: 16/904,906

(22) Filed: Jun. 18, 2020

(65) Prior Publication Data

US 2021/0016607 A1 Jan. 21, 2021

(30) Foreign Application Priority Data

Jul. 16, 2019 (JP) ................................ 2019-131265

(51) Int. Cl.
*B60C 11/11* (2006.01)
*B60C 11/12* (2006.01)
*B60C 11/03* (2006.01)
*B60C 11/13* (2006.01)

(52) U.S. Cl.
CPC ............ *B60C 11/11* (2013.01); *B60C 11/033* (2013.01); *B60C 11/1204* (2013.01); *B60C 11/1307* (2013.01); *B60C 2011/0346* (2013.01); *B60C 2011/0372* (2013.01)

(58) Field of Classification Search
CPC . B60C 11/0327; B60C 11/11; B60C 11/1204; B60C 11/033; B60C 11/1307; B60C 2011/0346; B60C 2011/0372
See application file for complete search history.

(56) References Cited

U.S. PATENT DOCUMENTS

| 5,957,180 A * | 9/1999 | Kuramochi ............. B60C 11/13 |
| | | 152/902 |
| 2018/0009267 A1* | 1/2018 | Takahashi ............... B60C 11/01 |
| 2018/0361798 A1 | 12/2018 | Kurosawa |
| 2020/0156416 A1* | 5/2020 | Ito ....................... B60C 11/1376 |
| 2021/0016606 A1* | 1/2021 | Ito ....................... B60C 11/1236 |
| 2021/0107319 A1* | 4/2021 | Tanida ................ B60C 11/1236 |
| 2021/0362550 A1* | 11/2021 | Sakamoto ........... B60C 11/0304 |

FOREIGN PATENT DOCUMENTS

| JP | H09300914 A | * | 11/1997 | ........... B60C 11/033 |
| JP | 2019-6371 A | | 1/2019 | |
| WO | WO-2019142643 A1 | * | 7/2019 | ............. B60C 11/01 |

* cited by examiner

*Primary Examiner* — Justin R Fischer
*Assistant Examiner* — Philip N Schwartz
(74) *Attorney, Agent, or Firm* — Greenblum & Bernstein, P.L.C.

(57) ABSTRACT

A tire includes a tread portion including a pair of shoulder main grooves, a crown region defined between the pair of the shoulder main grooves, and a pair of shoulder regions arranged on both outer sides of the pair of the shoulder main grooves. A land ratio of the crown region is 50% or more and 70% or less. A land ratio of the shoulder regions is 50% or more and 70% or less. The land ratio of the crown region is larger than the land ratio of the shoulder regions.

18 Claims, 7 Drawing Sheets

TIRE

TECHNICAL FIELD

The present invention relates to a tire suitable for off-road running.

BACKGROUND ART

Patent Document 1 listed below has proposed a pneumatic tire suitable for off-road running. In the pneumatic tire, improvement in durability performance and steering stability performance on a dry road surface is expected while maintaining off-road running performance by improving sipes provided in blocks.

PRIOR ART DOCUMENT

Patent Document

[Patent Document 1]
Japanese Unexamined Patent Application Publication No. 2019-006371

SUMMARY OF THE INVENTION

Problems to be Solved by the Invention

In a tire designed for off-road running, in order to improve traction performance, it is considered that a groove volume in a ground contacting surface is set to be large. On the other hand, an increase in the groove volume causes a decrease in pattern rigidity of the land region, therefore, anti-wear performance tends to be impaired.

The present invention was made in view of the above, and a primary object thereof is to provide a tire capable of improving off-road traction performance while suppressing an excessive decrease in the anti-wear performance.

Means for Solving the Problems

The present invention is a tire including a tread portion, wherein the tread portion includes a pair of shoulder main grooves, a crown region defined between the pair of the shoulder main grooves, and a pair of shoulder regions arranged on both outer sides of the pair of the shoulder main grooves, a land ratio of the crown region is 50% or more and 70% or less, a land ratio of the shoulder regions is 50% or more and 70% or less, and the land ratio of the crown region is larger than the land ratio of the shoulder regions.

In the present invention, it is preferred that the crown region includes a plurality of crown lateral grooves connecting the pair of the shoulder main grooves, and crown pattern elements each defined between the crown lateral grooves adjacent to each other in a tire circumferential direction, each of the crown pattern elements is divided into a plurality of crown blocks by sub grooves, the plurality of the crown blocks includes a minimum block having a smallest ground contacting surface area among the plurality of the crown blocks, and a maximum block having a largest ground contacting surface area among the crown blocks, and the ground contacting surface area of the minimum block is not less than 0.80 times the ground contacting surface area of the maximum block.

In the present invention, it is preferred that the sub grooves include a first sub groove extending obliquely from one of the shoulder main grooves and a second sub groove extending obliquely from the other one of the shoulder main grooves.

In the present invention, it is preferred that an angle of the first sub groove with respect to the tire circumferential direction and an angle of the second sub groove with respect to the tire circumferential direction are each 30 degrees or more and 60 degrees or less.

In the present invention, it is preferred that the sub grooves include a third sub groove connecting the first sub groove and the second sub groove, and in a cross-sectional view of the third sub groove, at least one of groove walls of the third sub groove is bent in a stepwise manner.

In the present invention, it is preferred that the first sub groove and the second sub groove are inclined to the same side with respect to a tire axial direction, and the third sub groove is inclined to a side opposite to the first sub groove and the second sub groove with respect to the tire axial direction.

In the present invention, it is preferred that a groove width of the third sub groove is larger than each of a groove width of the first sub groove and a groove width of the second sub groove.

In the present invention, it is preferred that the sub grooves include a fourth sub groove extending from the first sub groove or the third sub groove to one side in the tire circumferential direction, and a fifth sub groove extending from the second sub groove or the third sub groove to the other side in the tire circumferential direction.

In the present invention, it is preferred that each of the crown pattern elements includes a first crown block and a second crown block having the ground contacting surfaces of different shapes.

In the present invention, it is preferred that a length in the tire circumferential direction of the first crown block is larger than a length in the tire axial direction of the first crown block.

In the present invention, it is preferred that a length in the tire circumferential direction of the second crown block is smaller than a length in the tire axial direction of the second crown block.

Effects of the Invention

The tread portion of the tire according to the present invention includes a pair of the shoulder main grooves, the crown region defined between the pair of the shoulder main grooves, and a pair of the shoulder regions arranged on both outer sides of the pair of the shoulder main grooves. The land ratio of the crown region is 50% or more and 70% or less and the land ratio of the shoulder regions is 50% or more and 70% or less. Thereby, in the crown region and the shoulder regions, an opening area of a groove portion is secured while rigidity of the land regions is maintained. Therefore, the anti-wear performance and the off-road traction performance are improved.

On the other hand, as described above, in the tire in which the land ratio is set to be small, when the tire is inflated with air, the vicinity of the shoulder main grooves is likely to be curved, and as a result, the crown region is likely to protrude outward in a tire radial direction. In particular, when the tire is mounted on a pickup vehicle or the like, the tire is inflated to a high air pressure, therefore, the protrusion of the crown region becomes significant along with the influence of the land ratio. When the tire is used in such a situation, crown wear, which means the crown region wearing early, tends to occur. In the present invention, since the land ratio of the crown region is set to be larger than the land ratio of the shoulder regions, the protrusion of the crown region when the tire is inflated is suppressed, therefore, it is possible that uneven wear of the crown region is suppressed.

MODE FOR CARRYING OUT THE INVENTION

An embodiment of the present invention will now be described in conjunction with accompanying drawings.

Figure 1:
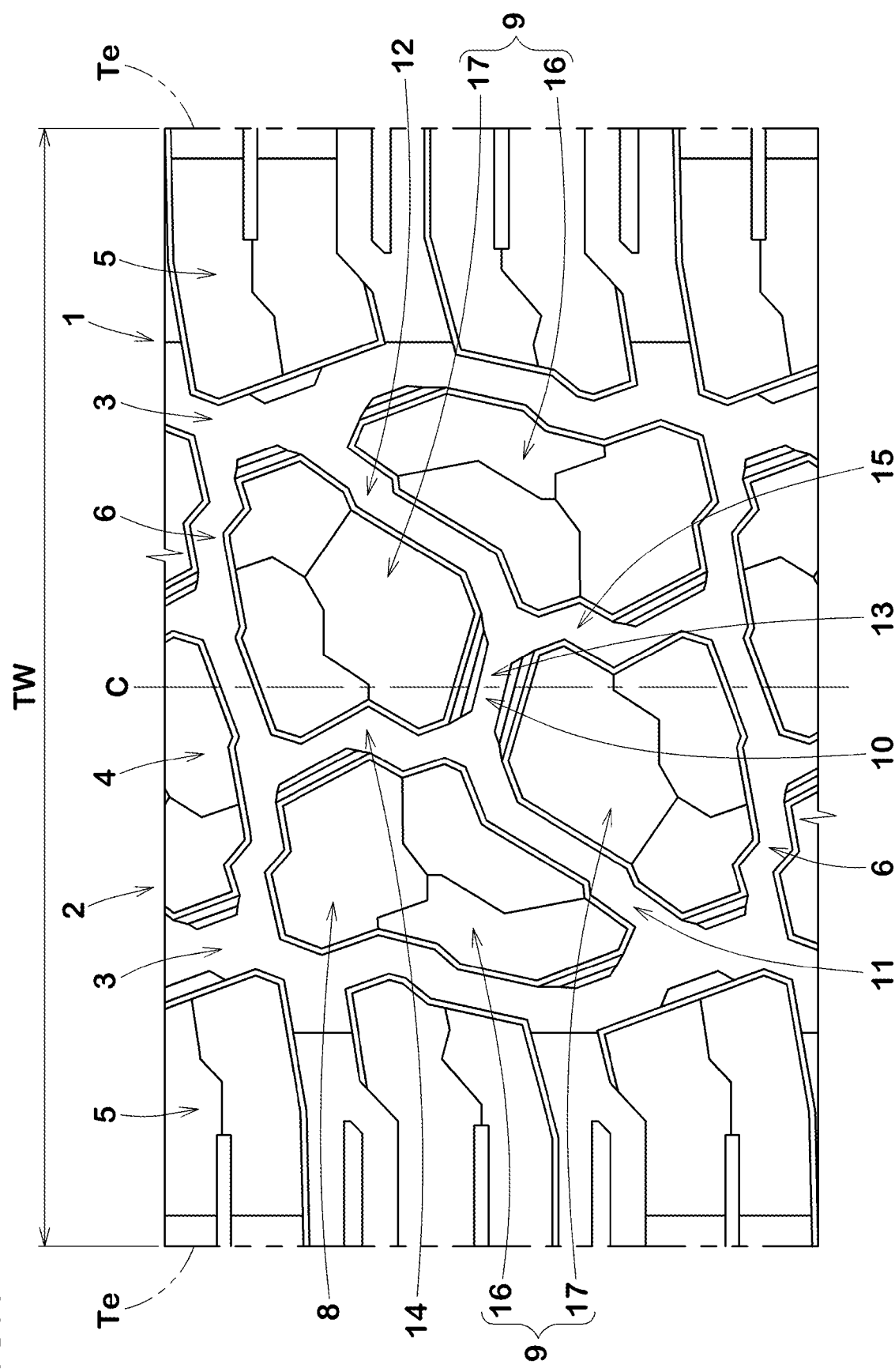
FIG. 1 a development view of a tread portion of a tire according to an embodiment of the present invention.

FIG. 1 is a development view of a tread portion 2 of a tire 1 according to the present embodiment (hereinafter, may be simply referred to as "tire 1"). As shown in FIG. 1, the tire 1 of the present embodiment is suitably used as a pneumatic tire for SUVs which are expected to run off-road, for example. However, the tire 1 of the present invention is not limited to such an embodiment.

The tread portion 2 of the tire 1 of the present embodiment includes a pair of shoulder main grooves 3 provided so as to sandwich a tire equator (C), a crown region 4 defined between the pair of the shoulder main grooves 3, and a pair of shoulder regions 5 arranged on both outer sides of the pair of the shoulder main grooves 3.

The shoulder main grooves 3 extend continuously in a tire circumferential direction. The shoulder main grooves 3 of the present embodiment extend in a zigzag shape in the tire circumferential direction. It is preferred that a distance in a tire axial direction from the tire equator (C) to a groove center line of each of the shoulder main grooves 3 is not less than 0.20 times and not more than 0.30 times a tread width (TW), for example. The tread width (TW) is a distance in the tire axial direction from one of tread edges (Te) to the other one of the tread edges (Te) in a standard state.

The "tread edges (Te)" are axially outermost ground contacting positions of the tire 1 when the tire 1 in a standard state is in contact with a flat surface with zero camber angle by being loaded with a standard tire load. The standard state is a state in which the tire 1 is mounted on a standard rim (not shown), inflated to a standard inner pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

It is preferred that each of groove widths of the shoulder main grooves 3 is 4% or more and 8% or less of the tread width (TW), for example. It is preferred that each of the groove widths of the main grooves is 5 mm or more and 15 mm or less, for example.

A land ratio of the crown region 4 is 50% or more and 70% or less. Each of land ratios of the shoulder regions 5 is 50% or more and 70% or less. Thereby, in the crown region 4 and the shoulder regions 5, opening areas of grooves are secured while rigidity of the land regions is maintained. Therefore, the anti-wear performance and the off-road traction performance are improved. It should be noted that the "land ratio" in the present specification is a ratio of the actual ground contacting area with respect to an area of a virtual ground contacting surface obtained by filling the grooves and sipes.

On the other hand, as described above, in the tire in which the land ratio is set to be small, when the tire is inflated with air, the vicinity of the shoulder main grooves 3 is likely to be curved, and as a result, the crown region 4 is likely to protrude outward in a tire radial direction. In particular, when the tire is mounted on a pickup vehicle or the like, the tire is inflated to a high air pressure, therefore, the protrusion of the crown region 4 becomes significant along with the influence of the land ratio. When the tire is used in such a situation, crown wear, which means the crown region 4 wearing early, tends to occur. In the present invention, since the land ratio of the crown region 4 is set to be larger than the land ratio of the shoulder regions 5, the protrusion of the crown region 4 when the tire is inflated is suppressed, therefore, it is possible that uneven wear of the crown region 4 is suppressed.

Figure 2:
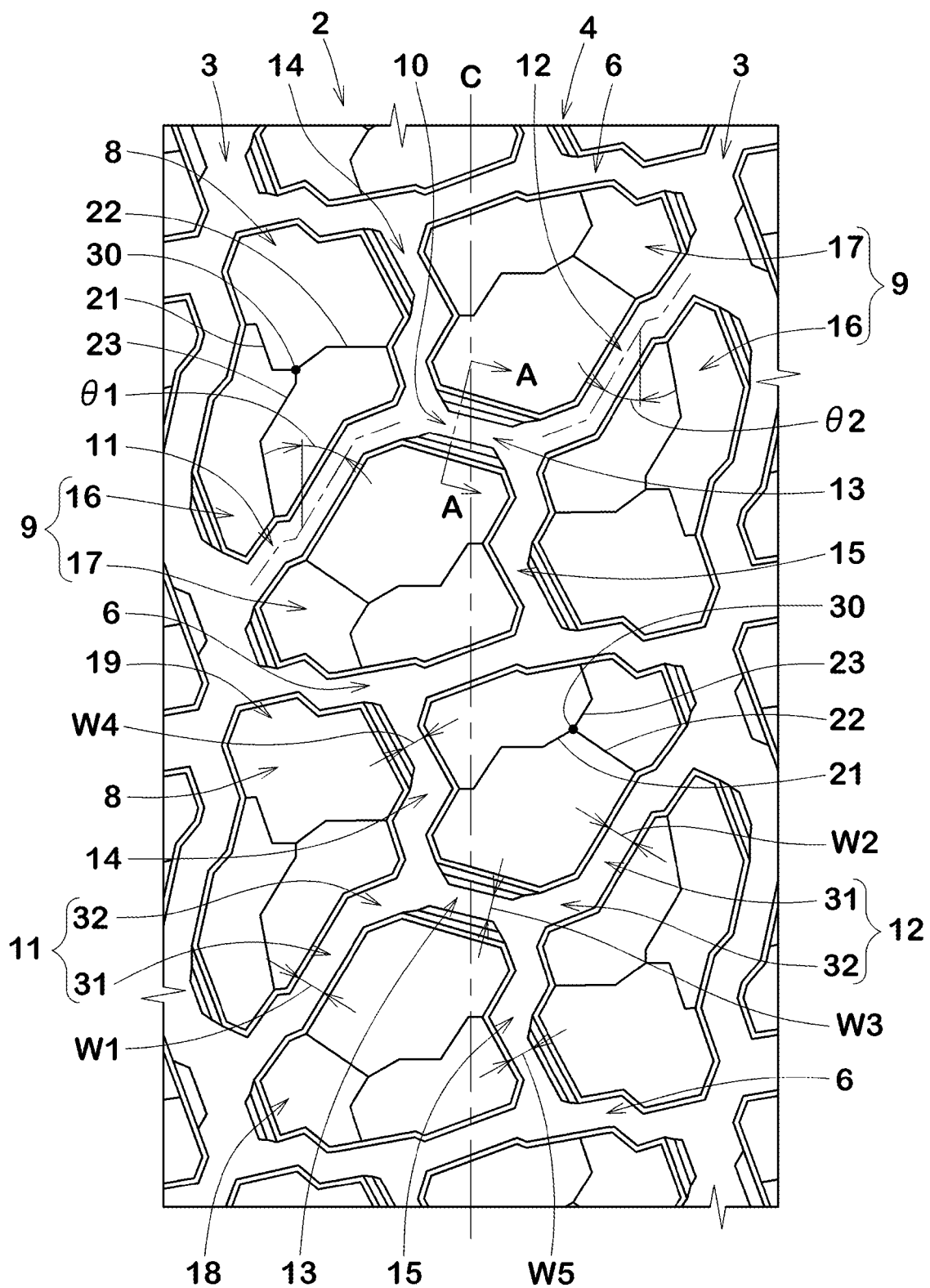
FIG. 2 an enlarged view of a crown region of FIG. 1.

In FIG. 2, an enlarged view of the crown region 4 is shown. As shown in FIG. 2, the crown region 4 includes a plurality of crown lateral grooves 6 each connecting the pair of the shoulder main grooves 3 and crown pattern elements 8 each defined between the crown lateral grooves 6 adjacent to each other in the tire circumferential direction.

The crown lateral grooves 6 extend at an angle of zero degrees or more and 15 degrees or less with respect to the tire axial direction, for example. The crown lateral grooves 6 of the present embodiment extend in the tire axial direction so as to include at least one bent portion.

Each of the crown pattern elements 8 is divided into a plurality of crown blocks 9 by sub groove s 10.

The sub grooves 10 include first sub grooves 11 and second sub grooves 12, for example. The first sub grooves 11 extend obliquely (upward to the right in FIG. 2) from the shoulder main groove 3 on one side. The second sub grooves 12 extend obliquely (downward to the left in FIG. 2) from the shoulder main groove 3 on the other side. The first sub grooves 11 and the second sub grooves 12 of the present embodiment are inclined to the same side with respect to the tire axial direction. The first sub grooves 11 and the second sub grooves 12 of the present embodiment extend obliquely so as to include at least one bent portion.

It is preferred that each of angles $\theta 1$ of the first sub grooves 11 with respect to the tire circumferential direction and each of angles $\theta 2$ of the second sub grooves 12 with respect to the tire circumferential direction is 30 degrees or more and 60 degrees or less. The first sub grooves 11 and the second sub grooves 12 configured as such are useful for suppressing pitch noise on a paved road while maintaining the off-road traction performance.

In order to further increase the above-described effects, each of the first sub grooves 11 and the second sub grooves 12 has a steeply inclined portion 31 connected with either one of the shoulder main grooves 3 and a gently inclined portion 32 having a larger angle with respect to the tire circumferential direction than the steeply inclined portion 31.

The sub grooves 10 include third sub grooves 13 each connecting one of the first sub grooves 11 and one of the second sub grooves 12 adjacent to each other in the tire axial direction. In each of the crown pattern elements 8, the third sub groove 13 of the present embodiment connects between the gently inclined portion 32 of the first sub groove 11 and the gently inclined portion 32 of the second sub groove 12. Further, the third sub grooves 13 cross the tire equator (C). The third sub grooves 13 configured as such provide frictional force in a different direction from the first sub grooves 11 and the second sub grooves 12 when running off road, therefore, off-road performance is improved.

The third sub grooves 13 are inclined in a direction opposite to the first sub grooves 11 and the second sub grooves 12 with respect to the tire axial direction. Each of angles of the third sub grooves 13 with respect to the tire axial direction is 10 degrees or more and 20 degrees or less, for example.

It is preferred that each of groove widths (W3) of the third sub grooves 13 is larger than each of groove widths (W1) of the first sub grooves 11 and each of groove widths (W2) of the second sub grooves 12. Specifically, each of the groove widths (W3) of the third sub grooves 13 is not less than 1.50 times and not more than 2.00 times each of the groove widths (W1) of the first sub grooves 11 or each of the groove widths (W2) of the second sub grooves 12. The third sub grooves 13 configured as such take in a lot of mud and dirt inside during off-road running and provide reaction force.

Figure 3:
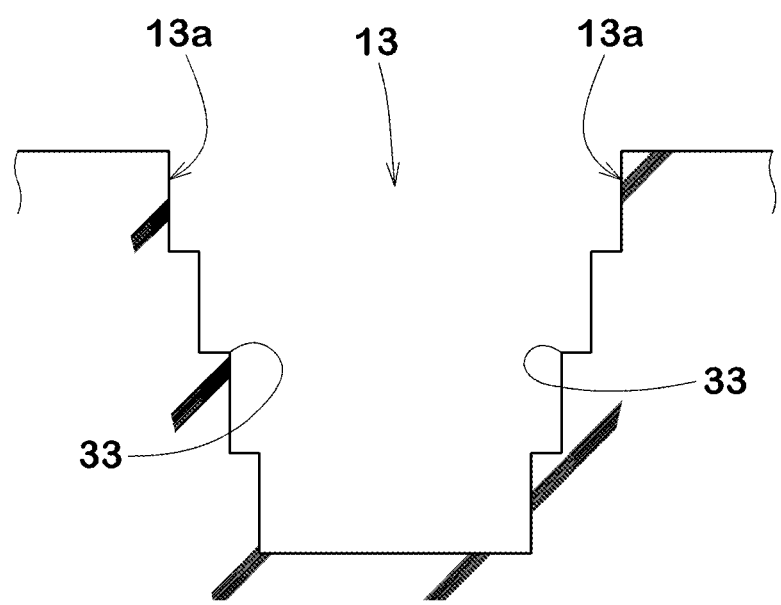
FIG. 3 a cross-sectional view taken along A-A line of FIG. 2.

FIG. 3 is a cross-sectional view taken along A-A line of one of the third sub grooves 13 of FIG. 2. As shown in FIG. 3, in the cross-sectional view of the third sub groove 13, it is preferred that at least one of groove walls (13a) of the third sub groove 13 is bent in a stepwise manner. In the present embodiment, the groove walls (13a) on both sides of each of the third sub grooves 13 are bent in a stepwise manner. Each of the groove walls includes 3 or more and 5 or less convex portions 33, for example. The third sub grooves 13 configured as such provide large frictional force by edges of the convex portions 33 during off-road running. Further, the groove walls are useful for preventing mud, dirt, and the like from being retained in the third sub grooves 13.

As shown in FIG. 2, the sub grooves 10 of the present embodiment include fourth sub grooves 14 and fifth sub grooves 15. In each of the crown pattern elements 8, the fourth sub groove 14 extends from the first sub groove 11 or the third sub groove 13 to one side in the tire circumferential direction so as to be connected with one of the crown lateral grooves 6 adjacent on one side. In each of the fourth sub grooves 14 of the present embodiment, one of groove edges is continuous with one of groove edges of the first sub groove 11, and the other one of the groove edges is continuous with one of groove edges of the third sub groove 13. The fifth sub groove 15 extends from the second sub groove 12 or the third sub groove 13 to the other side in the tire circumferential direction so as to be connected with one of the crown lateral grooves 6 adjacent on the other side. In each of the fifth sub grooves 15 of the present embodiment, one of groove edges is continuous with the one of groove edges of the second sub groove 12, and the other one of the groove edges is continuous with the other one of the groove edges of the third sub groove 13. The fourth sub grooves 14 and the fifth sub grooves 15 are useful for improving off-road cornering performance.

It is preferred that the fourth sub grooves 14 and the fifth sub grooves 15 extend in a zigzag manner. It is preferred that each of groove widths (W4) of the fourth sub grooves 14 and groove widths (W5) of the fifth sub grooves 15 is smaller than each of the groove widths (W3) of the third sub grooves 13. Specifically, each of the groove widths (W4) of the fourth sub grooves 14 and the groove widths (W5) of the fifth sub grooves 15 is not less than 0.60 times and not more than 0.80 times each of the groove widths (W3) of the third sub grooves 13. The fourth sub grooves 14 and the fifth sub grooves 15 configured as such maintain the rigidity in the tire axial direction of the crown pattern elements 8, therefore, it is possible that an excessive decrease in the anti-wear performance is suppressed.

Each of the crown pattern elements 8 of the present embodiment includes four crown blocks 9 divided by the sub grooves 10 described above. Each of the crown pattern elements 8 includes first crown blocks 16 and second crown blocks 17 having different shapes of ground contacting surfaces, for example.

Figure 4:
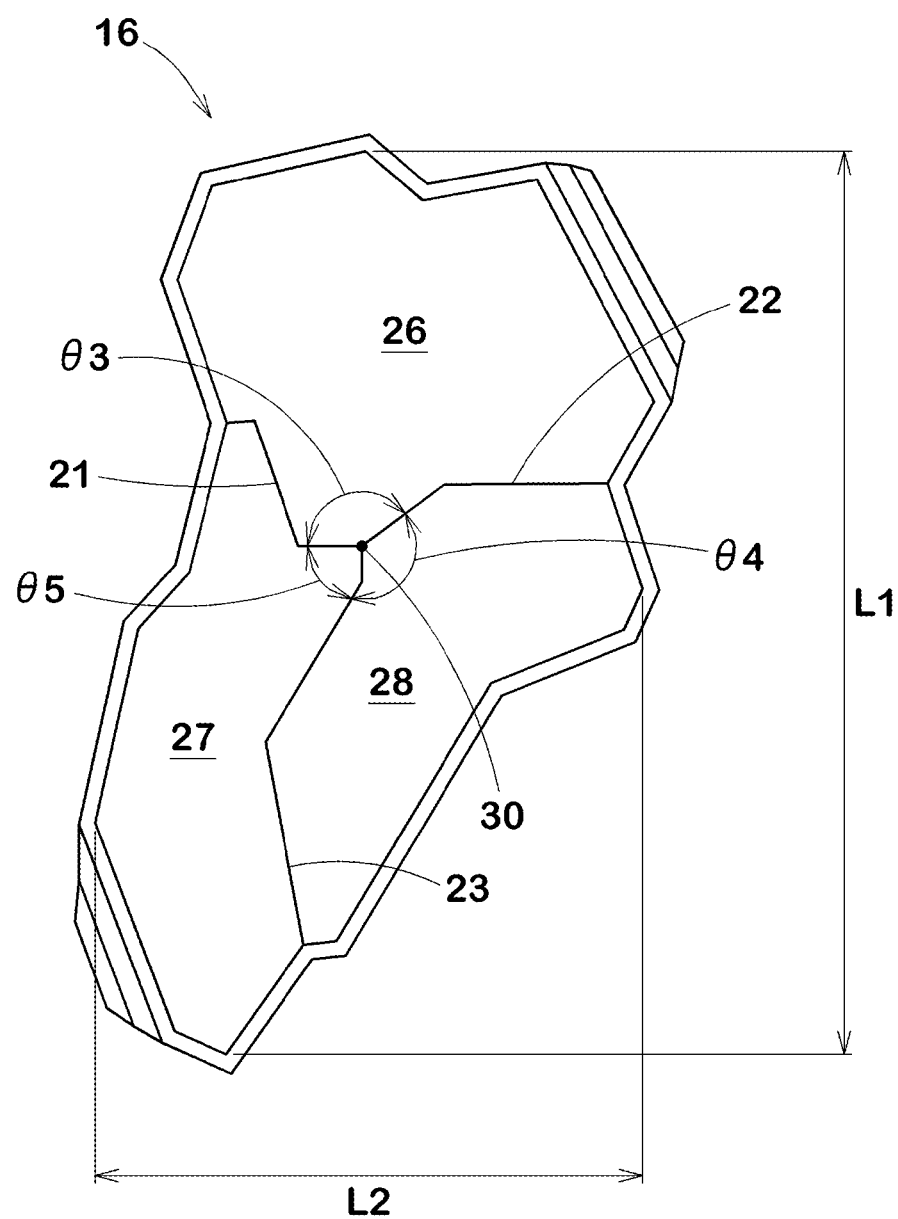
FIG. 4 an enlarged view of a first crown block of FIG. 2.

FIG. 4 is an enlarged view of one of the first crown blocks 16. As shown in FIG. 4, in each of the first crown blocks 16, it is preferred that a length (L1) in the tire circumferential direction is larger than a length (L2) in the tire axial direction. In each of the first crown blocks 16, the length (L2) in the tire axial direction is not less than 0.50 times and not more than 0.70 times the length (L1) in the tire circumferential direction, for example. The first crown blocks 16 configured as such provide large frictional force in the tire axial direction, therefore, the off-road cornering performance is improved. Further, the first crown blocks 16 are easily and moderately deformed in the tire axial direction, therefore, retention of mud or dirt in the sub grooves 10 can be suppressed.

Figure 5:
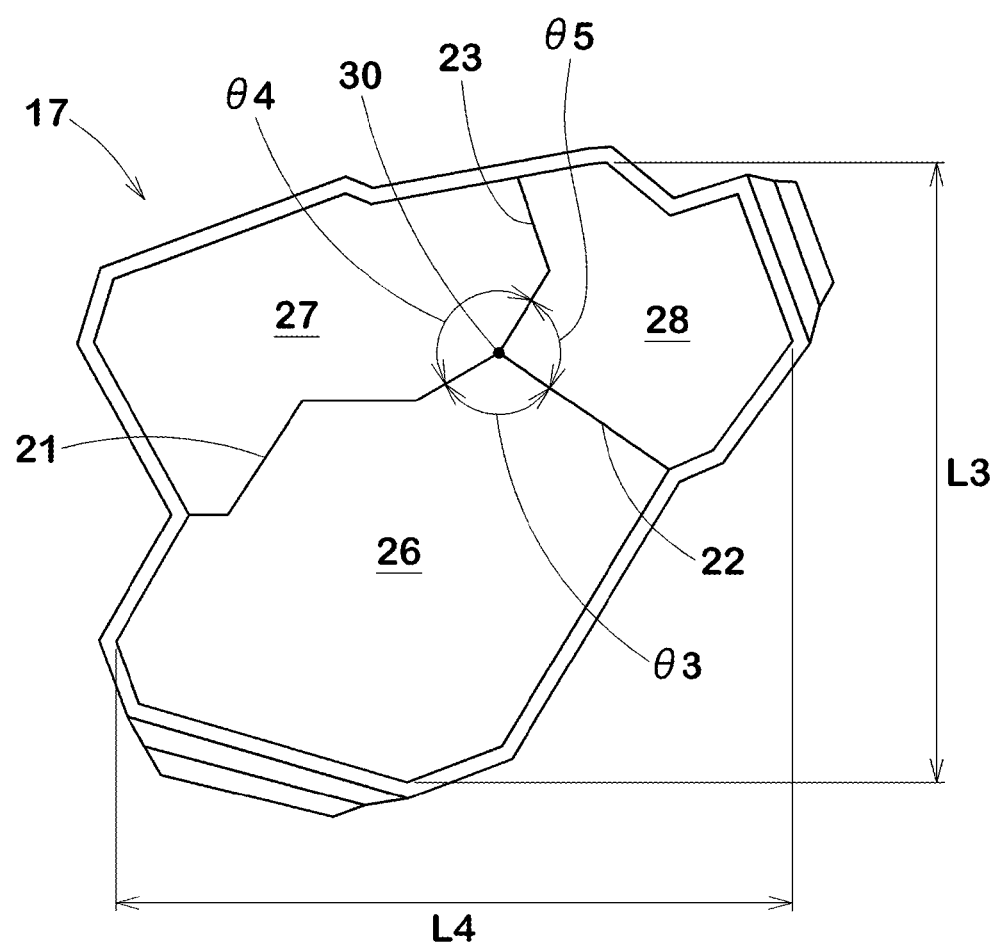
FIG. 5 an enlarged view of a second crown block of FIG. 2.

FIG. 5 is an enlarged view of one of the second crown blocks 17. As shown in FIG. 5, in each of the second crown blocks 17, it is preferred that a length (L3) in the tire circumferential direction is smaller than a length (L4) in the tire axial direction. In each of the second crown blocks 17, the length (L3) in the tire circumferential direction is not less than 0.80 times and not more than 0.95 times the length (L4) in the tire axial direction, for example. The second crown blocks 17 configured as such improve the traction performance during running off-road while maintaining the anti-wear performance.

As shown in FIG. 2, each of the crown pattern elements 8 includes two first crown blocks 16. Further, these two first crown blocks 16 are arranged so as to be point-symmetrical to each other. Similarly, each of the crown pattern elements 8 includes two second crown blocks 17. The two second crown blocks 17 are arranged so as to be point-symmetrical to each other. The crown pattern elements 8 configured as such are useful for suppressing the occurrence of the uneven wear in each part.

The plurality of the crown blocks 9 includes minimum blocks 18 having the smallest ground contacting surface areas among the plurality of the crown blocks, and maximum blocks 19 having the largest ground contacting surface areas among the crown blocks 9. Thereby, the minimum blocks 18 are relatively easily deformed, therefore, retention of mud or dirt in the sub grooves 10 during running off-road is suppressed. In the present embodiment, the first crown blocks 16 correspond to the maximum blocks 19 and the second crown blocks 17 correspond to the minimum blocks 18. Each of the ground contacting surface areas of the minimum blocks 18 is not less than 0.80 times each of the ground contacting surface areas of the maximum blocks 19. Thereby, the uneven wear is suppressed in each of the blocks.

As shown in FIG. 4 and FIG. 5, the ground contacting surface of at least one of the crown blocks 9 is provided with a first sipe 21, a second sipe 22, and a third sipe 23. In the present embodiment, each of the crown blocks 9 is provided with the first sipe 21, the second sipe 22, and the third sipe 23. In the present specification, a sipe means an incision having a width of 1.5 mm or less.

In the present embodiment, the first sipe 21, the second sipe 22, and the third sipe 23 are connected with each other at a single intersection 30. The first sipe 21, the second sipe 22, and the third sipe 23 terminate at the intersection 30. The first sipe 21, the second sipe 22, and the third sipe 23 extend from the intersection 30 in different directions. It should be noted that only the first sipe 21, the second sipe 22, and the third sipe 23 are connected with the intersection 30. Each of these sipes configured as such deforms the block centering on the intersection 30 while maintaining the rigidity of the block, thereby, ground contact of the block on a road surface is improved.

The first sipe 21, the second sipe 22 and the third sipe 23 of the present embodiment is connected with different edges of the ground contacting surface of the crown block 9. Thereby, the ground contacting surface of each of the crown blocks 9 includes a first surface 26, a second surface 27, and a third surface 28 divided by the first sipe 21, the second sipe 22, and the third sipe 23.

An area (S1) of the first surface 26 is larger than an area (S2) of the second surface 27 and an area (S3) of the third surface 28. The area (S1) of the first surface 26 is preferably not less than 0.65 times, more preferably not less than 0.73 times, and preferably not more than 1.45 times, more preferably not more than 1.36 times a total area obtained by adding the area (S2) of the second surface 27 and the area (S3) of the third surface 28. As a result, a block piece including the first surface 26 has a large rigidity, therefore, an excessive deformation of the block is suppressed.

It is preferred that the area (S2) of the second surface 27 is larger than the area (S3) of the third surface 28. The area (S3) of the third surface 28 is preferably not less than 0.60 times, more preferably not less than 0.66 times the area (S2) of the second surface 27. Thereby, the uneven wear of the second surface 27 and the third surface 28 is suppressed.

The first sipe 21 divides the first surface 26 and the second surface 27, and extends from the intersection 30 to one side in the tire axial direction. The second sipe 22 divides the first surface 26 and the third surface 28, and extends from the intersection 30 to the other side in the tire axial direction. The third sipe 23 divides the second surface 27 and the third surface 28, and extends from the intersection 30 to one side in the tire circumferential direction.

Specifically, as shown in FIG. 4, in each of the first crown blocks 16, the first sipe 21 extends from the intersection 30 to the left side, the second sipe 22 extends from the intersection 30 to the right side, and the third sipe 23 extends from the intersection 30 to the lower side. Further, as shown in FIG. 5, in each of the second crown blocks 17, the first sipe 21 extends from the intersection 30 to the left side, the second sipe 22 extends from the intersection 30 to the right side, and the third sipe 23 extends from the intersection 30 to the upper side.

The first surface 26 is defined on the other side in the tire circumferential direction of the first sipe 21 and the second sipe 22 (that is, the opposite side of the third sipe 23). As shown in FIG. 4 and FIG. 5, in each of the first crown blocks 16, the first surface 26 is defined on the upper side of the first sipe 21 and the second sipe 22, and in each of the second crown blocks 17, the first surface 26 is defined on the lower side of the first sipe 21 and the second sipe 22.

Each of the first sipe 21, the second sipe 22, and the third sipe 23 includes a portion that is bent at an angle of 90 degrees or more. The first sipe 21, the second sipe 22, and the third sipe 23 configured as such can provide frictional force in multiple directions and can exert excellent off-road performance. Further, each of the first sipe 21, the second sipe 22, and the third sipe 23 does not include a portion that is bent at an angle of less than 90 degrees. Thereby, the uneven wear of the ground contacting surface of the block is suppressed.

At the intersection 30, it is preferred that an angle $\theta 3$ between the first sipe 21 and the second sipe 22 and an angle $\theta 4$ between the second sipe 22 and the third sipe 23, and an angle $\theta 5$ between the first sipe 21 and the third sipe 23 are different from each other. The angle $\theta 3$ is 115 degrees or more and 150 degrees or less, for example. The angle $\theta 4$ is 125 degrees or more and 155 degrees or less, for example. The angle $\theta 5$ is 80 degrees or more and 100 degrees or less, for example.

Figure 6:
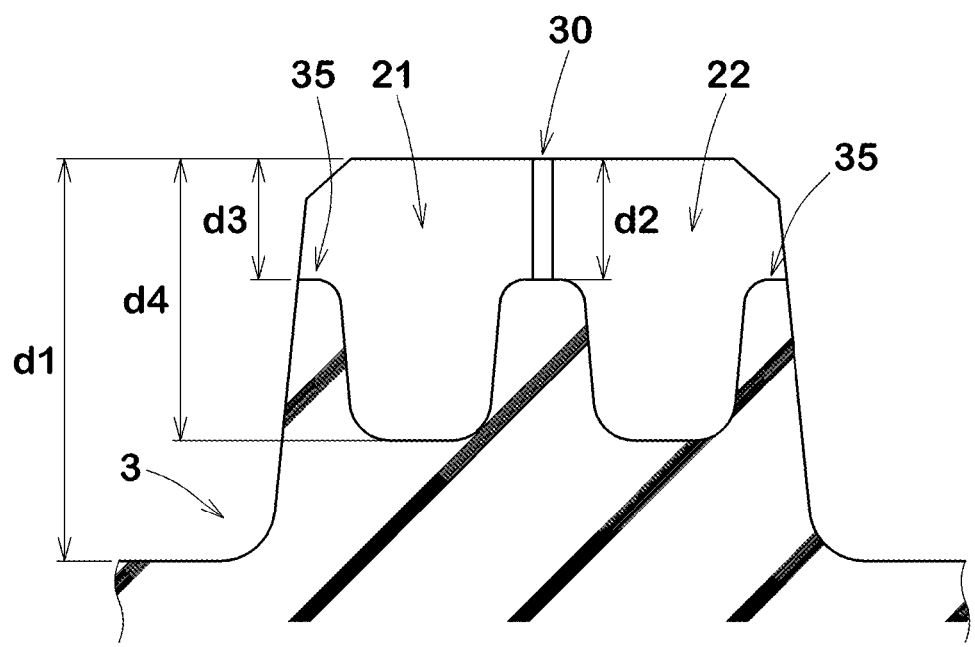
FIG. 6 a cross-sectional view of a crown block passing through a first sipe and a second sipe.

FIG. 6 is a lateral cross-sectional view of one of the crown blocks 9 passing through the first sipe 21 and the second sipe 22. As shown in FIG. 6, it is preferred that each of depths (d2) of the sipes at the intersection 30 is not less than 0.10 times and not more than 0.30 times each of depths (d1) of the shoulder main grooves 3. Thereby, the uneven wear in the vicinity of the intersection 30 is suppressed.

It is preferred that each of depths (d3) of the first sipe 21, the second sipe 22, and the third sipe 23 at a respective one of end portions 35 on a side of a respective one of the edges of the ground contacting surface is not less than 0.10 times and not more than 0.30 times each of the depths (d1) of the shoulder main grooves 3. Thereby, the uneven wear in the vicinity of the end portions 35 is suppressed.

It is preferred that a maximum depth (d4) of the first sipe 21, the second sipe 22, and the third sipe 23 is not less than 0.60 times and not more than 0.90 times each of the depths (d1) of the shoulder main grooves 3. Thereby, the anti-wear performance and the off-road traction performance are improved in a good balance.

Figure 7:
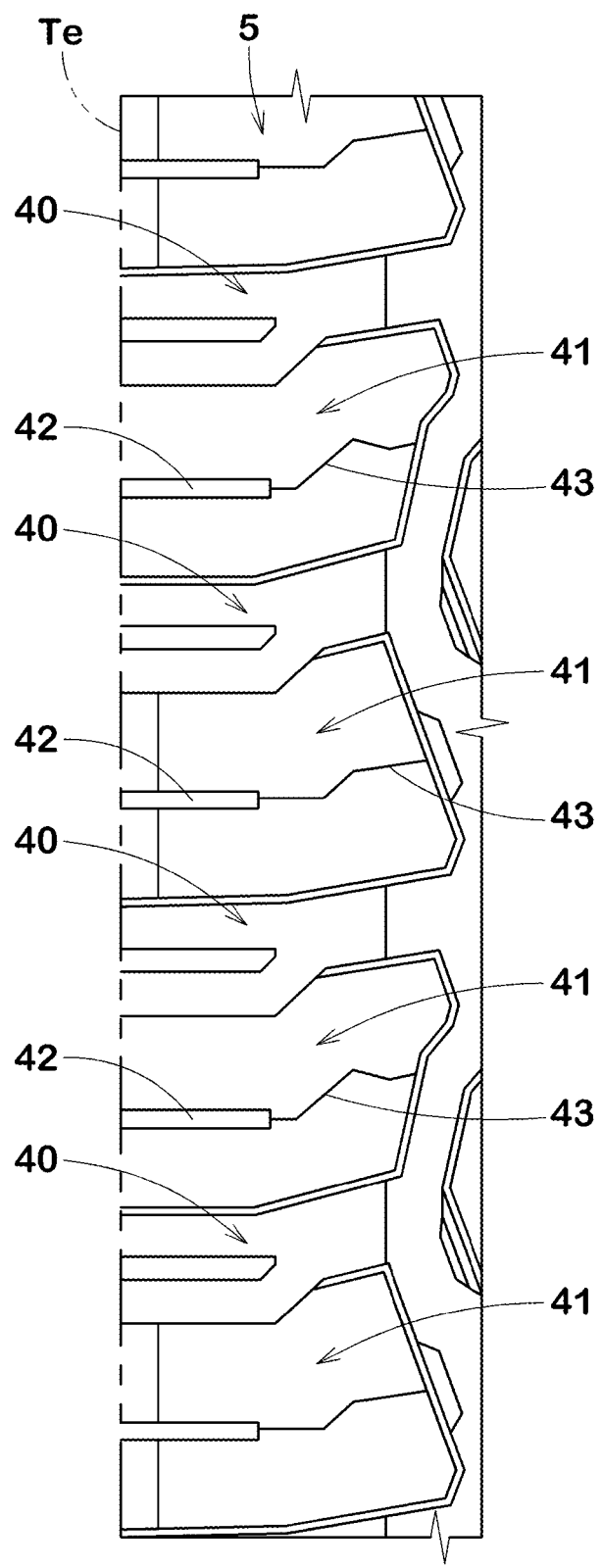
FIG. 7 an enlarged view of a shoulder region of FIG. 1.

FIG. 7 is an enlarged view of one of the shoulder regions 5. As shown in FIG. 7, each of the shoulder regions 5 includes a plurality of shoulder blocks 41 divided by a plurality of shoulder lateral grooves 40.

It is preferred that each of groove widths of the shoulder lateral grooves 40 is larger than each of groove widths of the crown lateral grooves 6, for example. It is preferred that each of the groove widths of the shoulder lateral grooves 40 gradually increases toward an adjacent one of the tread edges (Te), for example.

It is preferred that each of the shoulder blocks 41 is provided with a shoulder narrow groove 42 and a shoulder sipe 43, for example. The shoulder narrow groove 42 extends inward in the tire axial direction from the tread edge (Te) to terminate within the shoulder block 41. The shoulder sipe 43 extends from the shoulder narrow groove 42 to an adjacent one of the shoulder main grooves 3. It is preferred that the shoulder sipe 43 is partially bent, for example. The shoulder narrow grooves 42 and shoulder sipes 43 are useful for improving the off-road traction performance.

While detailed description has been made of the tire according to an embodiment of the present invention, the present invention can be embodied in various forms without being limited to the illustrated embodiment.

Working Examples (Examples)

Pneumatic tires of size 35×12.50R20LT having the basic pattern shown in FIG. 1 were made by way of test according to the specifications listed in Table 1. As References 1 to 3, tires having the basic pattern shown in FIG. 1 and having the same land ratio in the shoulder region and the crown region were made by way of test. The tires in the References 1 to 3 had the same configurations as the tires in Examples except the above-mentioned configurations. The anti-wear performance and the off-road traction performance were tested. Common specifications of the test tires and the test methods were as follows.
 Test vehicle: 4WD-car with a displacement of 3500 cc
 Test tire mounting position: all wheels
 Tire rim: 20×10J
 Tire inner pressure: 260 kPa for all wheels
<Anti-Wear Performance>

The appearance of wear in the crown region is evaluated by visual inspection after driving the above test vehicle on a paved road for 20,000 km. The results are indicated by an evaluation point based on the appearance of the Reference 1 being 100, wherein the larger the numerical value, the better the anti-wear performance is.

<Off-Road Traction Performance>

While a driver drove the above test vehicle off road, the traction performance was evaluated by the feeling of the driver. The results are indicated by the evaluation point based on the traction performance of the Reference 1 being 100, wherein the larger the numerical value, the better the off-road traction performance is.

The test results are shown in Table 1.

TABLE 1

|  |  | Ref.1 | Ref.2 | Ref.3 | Ex.1 | Ex.2 | Ex.3 | Ex.4 | Ex.5 | Ex.6 | Ex.7 |
|---|---|---|---|---|---|---|---|---|---|---|---|
| Land ratio of Crown region | [%] | 60.0 | 50.0 | 70.0 | 60.0 | 52.0 | 55.0 | 65.0 | 70.0 | 60.0 | 60.0 |
| Land ratio of Shoulder region | [%] | 60.0 | 50.0 | 70.0 | 58.0 | 50.0 | 53.0 | 63.0 | 68.0 | 54.0 | 56.0 |
| Anti-wear performance | [Evaluation point] | 100 | 90 | 110 | 102 | 92 | 95 | 105 | 111 | 100 | 101 |
| Off-road traction performance | [Evaluation point] | 100 | 110 | 90 | 103 | 110 | 109 | 97 | 93 | 105 | 104 |

As shown in Table 1, for each of the test tires, there is a tendency that the smaller the land ratio of each part, the higher the off-road traction performance and the lower the anti-wear performance. On the other hand, there is a tendency that the tires in each of the Examples have a higher total score of the anti-wear performance and the off-road traction performance as compared to the References having similar land ratio. That is, it was confirmed that the tires in each of the Examples improved the off-road traction performance while suppressing an excessive decrease in the anti-wear performance.

DESCRIPTION OF REFERENCE SIGNS 2 tread portion
3 shoulder main groove
4 crown region
5 shoulder region

The invention claimed is:

1. A tire comprising a tread portion, wherein
the tread portion includes a pair of shoulder main grooves, a crown region defined between the pair of the shoulder main grooves, and a pair of shoulder regions arranged on both outer sides of the pair of the shoulder main grooves,
a land ratio of the crown region is 50% or more and 70% or less,
a land ratio of the shoulder regions is 50% or more and 70% or less,
the land ratio of the crown region is larger than the land ratio of the shoulder regions,
the crown region includes a plurality of crown lateral grooves connecting the pair of the shoulder main grooves, and crown pattern elements each defined between the crown lateral grooves adjacent to each other in a tire circumferential direction,
each of the crown pattern elements is divided into a plurality of crown blocks by sub grooves,
the plurality of the crown blocks includes a minimum block having a smallest ground contacting surface area among the plurality of the crown blocks, and a maximum block having a largest ground contacting surface area among the crown blocks,
the ground contacting surface area of the minimum block is not less than 0.80 times the ground contacting surface area of the maximum block,
the crown lateral grooves extend at an angle of zero degrees or more and 15 degrees or less with respect to a tire axial direction,
the sub grooves include a first sub groove extending obliquely from one of the shoulder main grooves, a second sub groove extending obliquely from the other one of the shoulder main grooves, and a third sub groove connecting the first sub groove and the second sub groove,
in a cross-sectional view of the third sub groove, at least one of groove walls of the third sub groove is bent in a stepwise manner, and
the at least one of the groove walls of the third sub groove includes more convex portions than both groove walls of the first sub groove and both groove walls of the second sub groove.

2. The tire according to claim 1, wherein
an angle of the first sub groove with respect to the tire circumferential direction and an angle of the second sub groove with respect to the tire circumferential direction are each 30 degrees or more and 60 degrees or less.

3. The tire according to claim 1, wherein
the first sub groove and the second sub groove are inclined to the same side with respect to the tire axial direction, and
the third sub groove is inclined to a side opposite to the first sub groove and the second sub groove with respect to the tire axial direction.

4. The tire according to claim 1, wherein
a groove width of the third sub groove is larger than each of a groove width of the first sub groove and a groove width of the second sub groove.

5. The tire according to claim 1, wherein
the sub grooves include a fourth sub groove extending from the first sub groove or the third sub groove to one side in the tire circumferential direction, and a fifth sub groove extending from the second sub groove or the third sub groove to the other side in the tire circumferential direction.

6. The tire according to claim 1, wherein
each of the crown pattern elements includes a first crown block and a second crown block having the ground contacting surfaces of different shapes.

7. The tire according to claim 6, wherein
a length in the tire circumferential direction of the first crown block is larger than a length in the tire axial direction of the first crown block.

8. The tire according to claim 6, wherein
a length in the tire circumferential direction of the second crown block is smaller than a length in the tire axial direction of the second crown block.

9. The tire according to claim 1, wherein
each of the first sub groove and the second sub groove has a steeply inclined portion connected with either one of the shoulder main grooves and a gently inclined portion having a larger angle with respect to the tire circumferential direction than the steeply inclined portion, and
the third sub groove directly connects the gently inclined portion of the first sub groove and the gently inclined portion of the second sub groove.

10. The tire according to claim 3, wherein
an angle of the third sub groove with respect to the tire axial direction is 10 degrees or more and 20 degrees or less.

11. The tire according to claim 1, wherein
the at least one of the groove walls of the third sub groove includes 3 or more and 5 or less convex portions.

12. The tire according to claim 5, wherein
the fourth sub groove and the fifth sub groove extend in a zigzag manner.

13. The tire according to claim 5, wherein
a groove width of the fourth sub groove and a groove width of the fifth sub groove are each smaller than the groove width of the third sub groove.

14. The tire according to claim 7, wherein
the length in the tire axial direction of the first crown block is not less than 0.50 times and not more than 0.70 times the length in the tire circumferential direction of the first crown block.

15. The tire according to claim 8, wherein
the length in the tire circumferential direction of the second crown block is not less than 0.80 times and not more than 0.95 times the length in the tire axial direction of the second crown block.

16. The tire according to claim 6, wherein
each of the crown pattern elements includes two first crown blocks arranged so as to be point-symmetrical to each other, and
each of the crown pattern elements includes two second crown blocks arranged so as to be point-symmetrical to each other.

17. A tire comprising a tread portion, wherein
the tread portion includes a pair of shoulder main grooves, a crown region defined between the pair of the shoulder main grooves, and a pair of shoulder regions arranged on both outer sides of the pair of the shoulder main grooves,
a land ratio of the crown region is 50% or more and 70% or less,
a land ratio of the shoulder regions is 50% or more and 70% or less,
the land ratio of the crown region is larger than the land ratio of the shoulder regions,
the crown region includes a plurality of crown lateral grooves connecting the pair of the shoulder main grooves, and crown pattern elements each defined between the crown lateral grooves adjacent to each other in a tire circumferential direction,
each of the crown pattern elements is divided into a plurality of crown blocks by sub grooves,
the plurality of the crown blocks includes a minimum block having a smallest ground contacting surface area among the plurality of the crown blocks, and a maximum block having a largest ground contacting surface area among the crown blocks,
the ground contacting surface area of the minimum block is not less than 0.80 times the ground contacting surface area of the maximum block,
the sub grooves include a first sub groove extending obliquely from one of the shoulder main grooves, a second sub groove extending obliquely from the other one of the shoulder main grooves, and a third sub groove extending in a tire axial direction and connecting the first sub groove and the second sub groove,
the first sub groove is directly connected with one axial end of the third sub groove and the second sub groove is directly connected with the other axial end of the third sub groove,
in a cross-sectional view of the third sub groove, at least one of groove walls of the third sub groove is bent in a stepwise manner, and
the at least one of the groove walls of the third sub groove includes more convex portions than both groove walls of the first sub groove and both groove walls of the second sub groove.

18. A tire comprising a tread portion, wherein
the tread portion includes a pair of shoulder main grooves, a crown region defined between the pair of the shoulder main grooves, and a pair of shoulder regions arranged on both outer sides of the pair of the shoulder main grooves,
a land ratio of the crown region is 50% or more and 70% or less,
a land ratio of the shoulder regions is 50% or more and 70% or less,
the land ratio of the crown region is larger than the land ratio of the shoulder regions,
the crown region includes a plurality of crown lateral grooves connecting the pair of the shoulder main grooves, and crown pattern elements each defined between the crown lateral grooves adjacent to each other in a tire circumferential direction,
each of the crown pattern elements is divided into a plurality of crown blocks by sub grooves,
the plurality of the crown blocks includes a minimum block having a smallest ground contacting surface area among the plurality of the crown blocks, and a maximum block having a largest ground contacting surface area among the crown blocks, the ground contacting surface area of the minimum block is not less than 0.80 times the ground contacting surface area of the maximum block, the sub grooves include a first sub groove extending obliquely from one of the shoulder main grooves, a second sub groove extending obliquely from the other one of the shoulder main grooves, a third sub groove extending in a tire axial direction and connecting the first sub groove and the second sub groove, a fourth sub groove extending from the first sub groove or the third sub groove to one side in the tire circumferential direction, and a fifth sub groove extending from the second sub groove or the third sub groove to the other side in the tire circumferential direction, the fourth sub groove has an axially outer groove edge continuous with an axially outer groove edge of the first sub groove, and an axially inner groove edge continuous with one of groove edges of the third sub groove, the fifth sub groove has an axially outer groove edge continuous with an axially outer groove edge of the second sub groove, and an axially inner groove edge continuous with the other one of the groove edges of the third sub groove, in a cross-sectional view of the third sub groove, at least one of groove walls of the third sub groove is bent in a stepwise manner, and the at least one of the groove walls of the third sub groove includes more convex portions than both groove walls of the first sub groove and both groove walls of the second sub groove.

\* \* \* \* \*